United States Patent [19]

Belart et al.

[11] Patent Number: 4,484,509

[45] Date of Patent: Nov. 27, 1984

[54] BRAKE BOOSTER FOR AN AUTOMOTIVE VEHICLE

[75] Inventors: Juan Belart, Walldorf; Franz Wienecke, Oberursel, both of Fed. Rep. of Germany

[73] Assignee: ITT Industries, Inc., New York, N.Y.

[21] Appl. No.: 61,113

[22] Filed: Jul. 26, 1979

[30] Foreign Application Priority Data

Aug. 31, 1978 [DE] Fed. Rep. of Germany ....... 2837911

[51] Int. Cl.³ ............................................. F15B 9/10
[52] U.S. Cl. ................................ 91/369 A; 91/376 R; 92/48; 92/108; 92/169; 60/547.1
[58] Field of Search ...................... 92/48, 49, 107, 108, 92/166, 138, 98 R, 99, 98 D, 165 R, 165 PR, 93; 91/369 A, 369 B, 369 R, 376 R; 60/547.1

[56] References Cited

U.S. PATENT DOCUMENTS

| 11,549 | 8/1854 | Ellis | 92/107 |
| 42,430 | 4/1864 | Boyle | 92/49 |
| 905,108 | 11/1908 | Scott | 92/107 |
| 2,930,362 | 3/1960 | Riester, Jr. et al. | 92/93 |
| 3,101,219 | 8/1963 | Herrera | 92/48 |
| 3,172,338 | 3/1965 | Ackerman | 92/107 |
| 3,412,649 | 11/1968 | Franz | 92/93 |
| 3,603,208 | 9/1971 | Kytta | 92/48 |

FOREIGN PATENT DOCUMENTS 2922299 12/1979 Fed. Rep. of Germany ... 91/369 A

Primary Examiner—Paul E. Maslousky
Attorney, Agent, or Firm—James B. Raden; Marvin M. Chaban

[57] ABSTRACT

In vacuum brake boosters for motor vehicles, the vacuum casing is conventionally made of sheet steel. The vacuum casing is subjected to mechanical and pneumatic forces which have to be absorbed by the casing components. This makes it necessary to construct the casing components so they are strong enough to take these forces. The result of such construction is, however, high costs and high weight. To eliminate these disadvantages, the invention provides a brake booster wherein the vacuum casing includes a pipe therein extending in approximately coaxial of the longitudinal axis of the vacuum casing and connected to the transverse end walls of the vacuum casing, the pipe enclosing the master cylinder push rod, and the movable wall of the brake booster is sealed relative to the pipe and slidable thereon.

10 Claims, 6 Drawing Figures

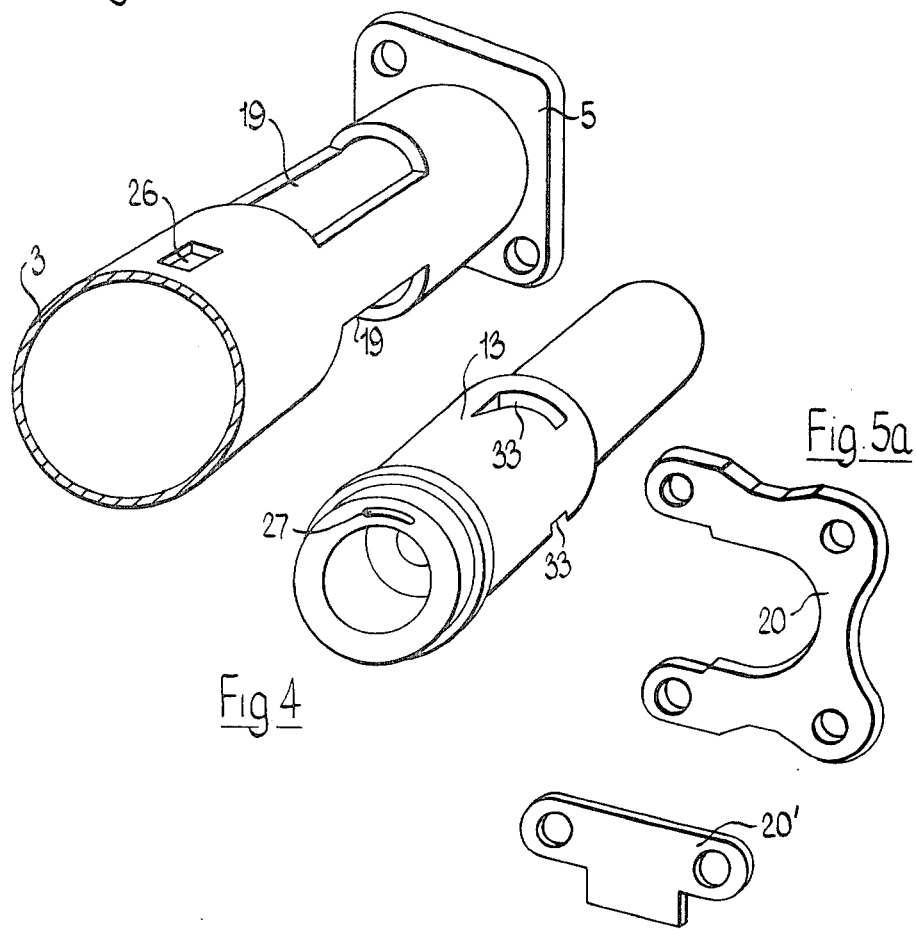

BRAKE BOOSTER FOR AN AUTOMOTIVE VEHICLE

BACKGROUND OF THE INVENTION

The present invention relates to a brake booster for an automotive vehicle, which utilizes the pressure differential between a vacuum and atmospheric pressure and comprises a vacuum casing having at least one movable wall disposed therein, the movable wall dividing the vacuum casing into a vacuum chamber and a working chamber and acting upon a push rod guided in the axial direction of the brake booster.

For German Patent DE-AS No. 2,345,314, a brake booster for an automotive vehicle is known which is operated by the differential of pressure between a vacuum and atmospheric pressure. The brake booster comprises a vacuum casing, a movable wall disposed therein and a control valve, the movable wall dividing the vacuum casing into a vacuum chamber of constant vacuum and a working chamber of different pressures by means of a diaphragm and acting on a push rod guided in the axial direction of the brake booster. The transverse end wall of the vacuum casing adjacent the control valve includes several bolts serving to secure the brake booster to the splash wall of an automotive vehicle. The transverse end wall of the vacuum casing adjacent the end of the push rod which extends out of the vacuum casing is employed to mount the master cylinder to the vacuum casing. As a rule, this mounting is accomplished by means of bolts bolted to the master-cylinder flange.

In an arrangement of this type, the vacuum casing is conventionally made of sheet steel. As a result of the pressure differential between vacuum and atmospheric pressure, pneumatic forces act on the vacuum casing. These forces, which somewhat compress the vacuum casing, have to be taken up by the components of the vacuum casing. To limit the amount of deformation of the vacuum casing, it is necessary to provide the casing components with an appropriate strength. These designs are, however, not economical because of the resultant increase in material costs in addition to being of high weight. Thus, such an arrangement is unable to comply with the vehicle manufacturers' demands for a lowest possible weight of brake systems without the safety and operability of the brake booster being impaired.

SUMMARY OF THE INVENTION

It is, therefore, an object of the present invention to provide a brake booster of the type described hereinabove in which the material costs and the weight are reduced.

A feature of the present invention is the provision of a brake booster for an automotive vehicle, which utilizes the pressure differential between a vacuum and atmospheric pressure comprising:

a vacuum casing having a longitudinal axis and at least one movable wall disposed therein, the movable wall acting upon a push rod movable along the axis and dividing the vacuum casing into a vacuum chamber and a working chamber; and a pipe disposed within the vacuum casing approximately coaxial of the axis and fastened to opposite transverse end walls of the vacuum casing, the pipe enclosing the push rod, the movable wall being sealed to the outer surface of the pipe and slidable thereon.

The essential advantages of the brake booster of the present invention are particularly that the weight of the brake booster is reduced by the elimination of reinforcements and the use of thinner-walled components, and that it is possible to manufacture the vacuum casing using lower-weight and less costly materials.

The arrangement disclosed in the present invention is of particularly importance for a mechanically controlled brake booster utilizing the pressure differential between a vacuum and atmospheric pressure and comprising a vacuum casing having at least one movable wall disposed therein, and a pressure control valve, in which the movable wall divides the vacuum casing into a chamber and a working chamber and acts upon a push rod guided in an axial direction of the brake booster, and in which the pressure control valve includes a control casing which is located at least partially within the vacuum casing with the vacuum casing being fastened to a splash wall by its one transverse end wall and a master cylinder is fastened to its other transverse end wall. The vacuum casing of such a brake booster as it is described, for example, in the above-mentioned German Patent is subjected to high forces, and this is the main problem to be overcome by the present invention.

As the brake pedal is depressed, the force transmitted by the brake pedal and the booster force act on the push rod. The resultant total force acts on the piston of the master cylinder, with the resistance of the compressed hydraulic fluid in the master cylinder necessitating, however, the presence of an opposed force component maintaining the master cylinder approximately in its position. This reaction force is transferred from the master cylinder via the sheetmetal components of the vacuum casing to the splashwall to which the pedal support is usually fastened.

On actuation of the brake booster, the reaction force results in an elongation of the vacuum casing in an axial direction and, consequently, in a displacement of the master cylinder which adds to the lost travel of the brake pedal. Because of the transmission ratio of the brake pedal, the elongation of the vacuum casing is increased bu a mutiple and transmitted to the brake pedal. The elongation is still further increased by the pneumatic forces acting on the vacuum casing. Their effects have to be taken into consideration to a still greater extent if the casing components are of reduced wall thickness.

Therefore, in mechanically controlled brake boosters, the advantages of the arrangement of the present invention, in addition to those mentioned in the foregoing, are in particular that (a) the lost travel of the brake pedal is reduced substantially because the vacuum casing is not subjected to the actuating force; and (b) the negative effects, with respect to the lost travel, of the pneumatic forces acting on the vacuum casing are eliminated.

It is an advantage that the control casing is slidably arranged in the pipe in the manner of a piston and sealed relative to the pipe by means of seals, one seal being located on the control casing's end adjacent the push rod and the other seal close to the pipe's end adjacent the splash wall. This arrangement enables the control valve casing to be situtated within the pipe whereby a space-saving construction is achieved.

In a preferred embodiment of the subject matter of the present invention, the pipe includes at least two slots extending in a longitudinal direction and receiving slidably therein at least one cross member to mechanically couple the movable wall to the push rod. The length of the slots determines the maximum displacement travel of the movable wall and the push rod, respectively. In an arrangement which is simple with respect to assembly and safe with respect to the mechanical load, the cross member engages a groove disposed on the circumferential surface of the control casing or the push rod normal to the longitudinal axis and is rigidly secured to the movable wall.

The movable wall includes advantageously a hub extending along the entire length of the slots, with the cross member being secured to the one end of the hub while its other end is provided with a slide seal. The movable wall is, thereby, at a small distance from the pipe along the length of the slots and, accordingly, the cross members may be of small height. The cross member is suitably of U- or T-shaped design. Two T-shaped or, alternatively, one U-shaped cross member may be used.

In an advantageous arrangement, two movable walls and a rigid partition wall arrangement between the two movable walls and fastened to vacuum casing are provided, and the movable walls are rigidly coupled to each other by means of two rods extending in parallel with the push rod. By these means, the two movable walls are moved synchronously, and the force acting thereon is transmitted to the push rod without the necessity of providing additional slots in the pipe. The rods extend through openings in the rigid partition wall, which openings are provided with slide seals. The working chambers are connected in a particularly advantageous manner requiring no additional elements by designing the rods as tubes, with an open end of each tube extending into the outward working chamber, and by providing radial openings close to the other tube end.

To seal the inward edge of the rigid partition wall on the pipe's circumferential surface, the inward edge of a rolling diaphragm of the movable wall is suitably clamped between the partition wall and the pipe. This arrangement obviates the necessity for a separate seal. To enable the pipe to be used as a connecting channel for the vacuum chambers, the pipe includes advantageously openings in the area of the vacuum chambers.

BRIEF DESCRIPTION OF THE DRAWING

Above-mentioned and other features and objects of this invention will become more apparent by reference to the following description taken in conjunction with the accompanying drawings, in which:

FIG. 3 is a detailed perspective view of the pipe of FIG. 1;

FIG. 4 is a detailed perspective view of the control casing of FIGS. 1 and 2; and FIGS. 5a and 5b show elements for the transmission of force between the movable wall and the control casing.

DESCRIPTION OF THE PREFERRED EMBODIMENTS

Figure 1:
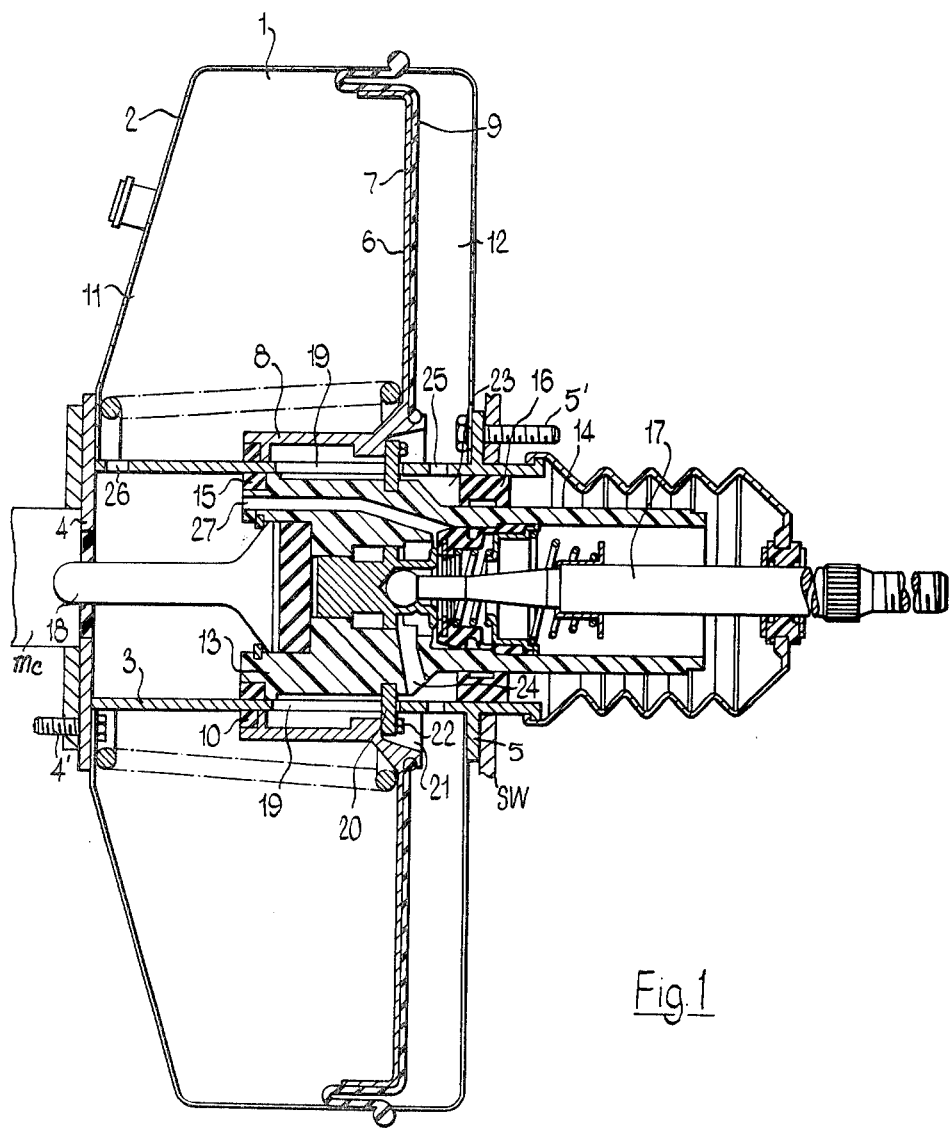
FIG. 1 is a longitudinal cross sectional view of a brake booster including a pipe in accordance with the principle of the present invention.

FIG. 1 shows a brake booster 1 including a vacuum casing 2 with a pipe 3 arranged therein coaxially. Pipe 3 has on one end thereof a first flange 4 for fastening a master cylinder MC thereto by means of bolts such as bolt 4' extending outwardly through the adjacent transverse end wall of casing 2 and flange 4 and, close to the other end, a second flange 5 fo fastening to a splash wall SW by means of bolts such as bolt 5' extending outwardly through the adjacent transverse end wall of vacuum casing 2 and flange 5. The transverse end walls of vacuum casing 2 are suitably sealed to flanges 4 and 5 and fastened thereto by the heads of bolts 4' and 5'. A movable wall 6 which comprises a diaphragm plate 7, a hub 8 and a rolling diaphragm 9, has its hub 8 slidably guided on pipe 3 and is sealed relative to the latter by means of a slide seal 10. The outward edge of rolling diaphragm 9 is clamped on the outer periphery of vacuum casing 2, and the inward edge is secured to hub 8 of movable wall 6, whereby a vacuum chamber 11 and a working chamber 12 are formed in vacuum casing 2.

Slidably arranged in pipe 3 is a control casing 13 of a pressure control valve 14, with control casing 13 being sealed relative to pipe 3 by means of slide seals 15 and 16. Control casing 13 extends out of pipe 3 adjacent flange 5. From this slide, a piston rod 17 which serves to actuate pressure control valve 14 extends into control casing 13. The other end of control casing 13 carries a push rod 18 which acts on the piston of a master cylinder (not shown in the drawing).

Pipe 3 includes two slots 19 extending in a longitudinal direction and located between slide seals 10 and 15 and flange 5. Two grooves which are engaged by cross members 20 are arranged on the circumferential surface of control casing 13 normal to the longitudinal axis. Cross members 20 extend through slots 19 into a recesses 21 on hub 8 and are secured to the hub by means of screws 22. The length of slots 19 determines the maximum displacement travel of movable wall 6 and control casing 13. Openings 25 in pipe 3 connect an annular chamber 23, which is formed by the outer circumferential surface of control casing 13 and the inner surface of pipe 3, with working chamber 12. A first channel 24 connects chamber 23 with valve 14. Pipe 3 includes, close to flange 4, an opening 26 which connects the chamber internal of pipe 3 with vacuum chamber 11. The chamber internal of pipe 3 is connected to valve 14 by a second channel 27.

Figure 2:
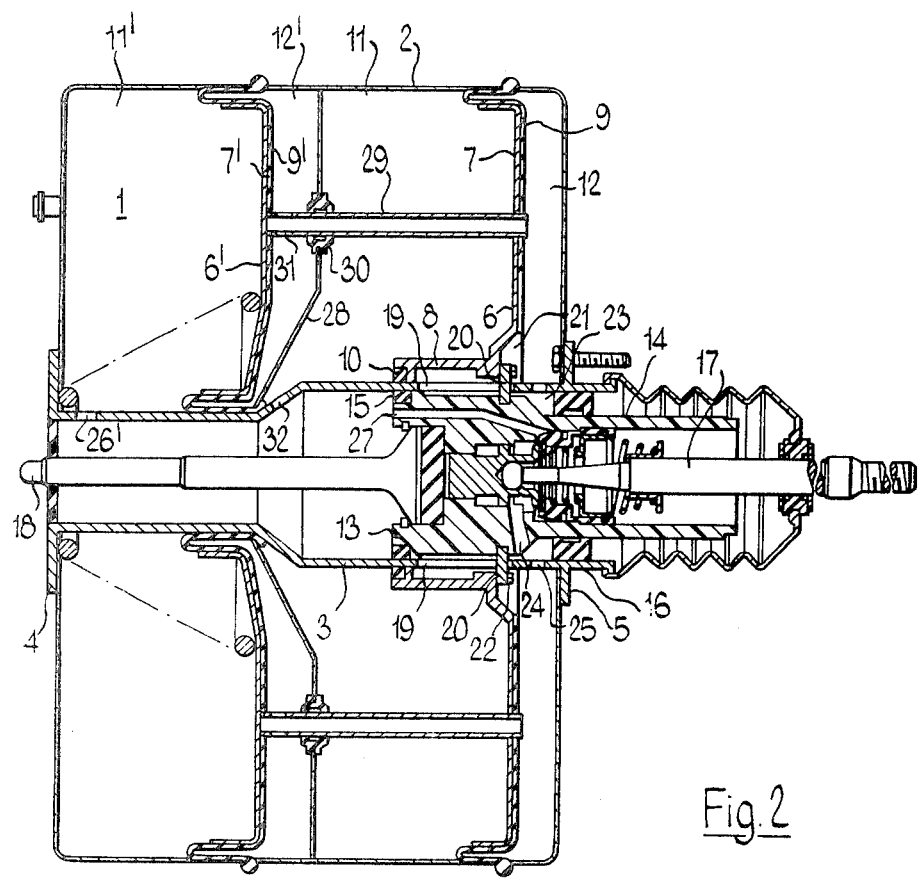
FIG. 2 is a longitudinal cross sectional view of a tandem brake booster in accordance with the principles of the present invention.

FIG. 2 shows the construction of a tandem brake booster. Parts identical with those of FIG. 1 have been assigned like reference numbers as in FIG. 1. To avoid repetitions, only those parts will be described that are represented differently or do not exist in FIG. 1.

Secured in vacuum casing 2 is a rigid partition wall 28 subdividing vacuum casing 2 into two compartments with movable wall 6 of FIG. 1 being arranged in the compartment adjacent control valve 14 and a movable wall 6' being arranged in the compartment adjacent the master cylinder. Movable wall 6', which comprises a diaphragm plate 7' and a rolling diaphragm 9', subdivides the compartment into a vacuum chamber 11' and a working chamber 12'. The outward edge of rolling diaphragm 9' is clamped on the outer periphery of vacuum casing 2, and inward edge is secured between the inward edge of partition wall 28 and pipe 3, thereby operating, at the same time, as a seal between partition wall 28 and pipe 3.

Diaphragm plates 7 and 7' are rigidly coupled to each other by means of two rods 20 extending parallel to push rod 18, with rods 29 being guided through suitable openings in partition wall 28. Provided in the openings of partition wall 28 are slide seals 30 which encloses rods 29. The end of each rod 29, which is designed as a tube, adjacent control valve 14 extends through movable wall 6 into working chamber 12, and adjacent the other end of rods 29 are radial openings 31, whereby a permanent connection between working chambers 12 and 12' is established.

Adjacent partition wall 28 in the area of vacuum chamber 11, pipe 3 includes an opening 32, and vacuum chambers 11 and 11' are in permanent communication through opening 26', the chamber internal to pipe 3, and opening 32.

FIG. 3 is a perspective view of pipe 3 of FIG. 1, in which flange 4 adjacent the master cylinder was omitted for reasons of clarity. The reference numerals assigned to the individual parts are identical with those of FIG. 1.

FIG. 4 is a perspective view of control casing 13 of FIGS. 1 and 2. On its circumferential surface, control casing 13 includes two grooves 33 arranged normal to the longitudinal axis for engagement by cross members 20.

FIGS. 5a and 5b show a U-shaped cross member 20 and a T-shaped cross member 20', respectively. For the transmission of force between movable wall 6 and control casing 13, either two T-shaped cross members 20' or, alternatively, one U-shaped cross member 20 may be used.

While we have described above the principles of our invention in connection with specific apparatus it is to be clearly understood that this description is made only by way of example and not as a limitation to the scope of our invention as set forth in the objects thereof and in the accompanying claims.

We claim:

1. A brake booster for a braking system comprising a housing having first and second opposing housing walls, a movable wall disposed in the housing between said spaced housing walls and dividing said housing into two chambers, axially aligned input and output members, means interconnecting said movable wall to said output member, a control valve assembly operated by said input member for controlling a pressure differential across said movable wall, a tubular member extending through the movable wall coaxially with the input and output members and connected to the opposing housing walls, said tubular member having longitudinally extending slot means disposed intermediately between said opposing housing walls with a portion of the interconnecting means extending through the slot means, said control valve assembly including a tubular valve body slidably disposed within said tubular member and having an end adjacent said output member and a portion adjacent said input member, and first and second sliding seals respectively arranged around said end and said portion of said valve body longitudinally enclosing said slot means therebetween said sealing the valve body to the inner surface of said tubular member.

2. A brake booster for a braking system comprising a housing having first and second spaced opposiing housing walls, a movable wall disposed in the housing between said spaced housing walls and dividing said housing into two chambers, axially aligned input and output members, means interconnecting said movable wall to said output member including a U-shaped cross-member, a control valve assembly operated by said input member for controlling a pressure differential across said movable wall, a tubular member extending through the movable wall coaxially with the input and output members and connected to the opposing housing walls, said tubular member having longitudinally extending slot means disposed between said opposing housing walls with the legs of the U-shaped cross-member of the interconnecting means extending through the slot means, said control valve assembly including a tubular valve body slidably disposed within said tubular member, a slot in said valve body, and with the legs of the U-shaped cross-member extending through said slot means and said slot to thereby join said movable wall to said valve body.

3. A brake booster for a braking system comprising a housing having first and second spaced opposing housing walls, a movable wall disposed in the housing between said spaced housing wall and dividing said housing into two chambers, axially aligned input and output members, means interconnecting said movable wall to said output member including at least one T-shaped cross-member, a control valve assembly operated by said input member for controlling a pressure differential across said movable wall, a tubular member extending through the movable wall coaxially with the input and output members and connected to the opposing housing walls, said tubular member having longitudinally extending slot means disposed between said opposing housing walls with the leg of the cross-member of the interconnecting means extending through the slot means, said control valve assembly including a tubular valve body slidably disposed within said tubular member and a slot in said valve body for receiving the leg of said cross-member for joining said wall member to said valve body for movement therewith.

4. A brake booster for a braking system comprising a housing having first and second spaced opposing housing walls, a movable wall disposed in the housing between said spaced housing walls dividing said housing into two chambers and including a hub having two ends, axially aligned input and output members, means interconnecting said movable wall to said output member including at least one cross-member secured to one of said ends of said hub, a control valve assembly operated by said input member for controlling a pressure differential across said movable wall, a tubular member extending through the movable wall coaxially with the input and output members and connected to the opposing housing walls, said tubular member having longitudinally extending intermediate slot means disposed between said opposing housing walls with a portion of the interconnecting means extending through the slot means, said hub extending along the entire length of said slot means, said control valve assembly including a tubular valve body slidably disposed within said tubular member, and a slide seal mounted on the other end of said hub and being in a slidable, sealed relationship with the outer surface of said tubular member axially externally of said slot means to seal said wall means to said tubular member.

5. A brake booster for a braking system comprising a housing having first and second spaced opposing housing walls, a movable wall disposed in the housing between said spaced housing walls and dividing said housing into two chambers, axially aligned input and output members, means interconnecting said movable wall to said output member including at least one cross-member rigidly secured to said movable wall, a control valve assembly operated by said input member for controlling a pressure differential across said movable wall, a tubular member extending through the movable wall coaxially with the input and output members and connected to the opposing housing walls, said tubular member having longitudinally extending slot means disposed between said opposing housing walls with a portion of the interconnecting means extending through the slot means, said control valve assembly including a tubular valve body slidably disposed within said tubular member and having at least one groove disposed in the outer surface thereof perpendicular to the axis, said cross-member engaging in said groove to mate said member to said valve body through said slot means, said movable wall includes a hub extending along the entire length of said slot means, one end of said hub being secured to said cross member and the other end of said hub having a slide seal in a slidable, sealed relation with the outer surface of said turbular member.

6. A brake booster for a braking system comprising a housing having first and second spaced opposing housing walls, two movable walls disposed in the housing between said spaced housing walls axially spaced from one another, axially aligned input and output members, means interconnecting one of said movable walls to said output member, a control valve assembly operated by said input member for controlling a pressure differential across said movable walls, a tubular member extending through the movable walls coaxially with the input and output members and connected to the opposing housing walls, said tubular member having longitudinally extending slot means disposed between said opposing housing walls with a portion of the interconnecting means extending through the slot means to allow longitudinal travel of the interconnecting means relative to said tubular member, said control valve assembly including a tubular valve body slidaby disposed within said tubular member, a rigid partition wall secured to said housing and said tubular member and disposed between said movable walls to divide said housing into two compartments, each of said movable walls dividing one of said compartments into working and vacuum chambers, and a plurality of rods extending parallel to the axis rigidly to connect said movably walls with one another.

7. A brake booster according to claim 6, wherein
said rods extend through partition openings in said partition wall, each of said partition openings being provided with a slide seal in a slidable, sealed relation with the outer surface of an associated one of said rods.

8. A brake booster according to claim 7, wherein
each of said two rods is a hollow tube having one open end thereof closed by the other of said movable walls, the other open end thereof projecting through said one movable wall into the working chamber associated with said one movable wall and radial openings adjacent said one open end opening into the other working chamber associated with said second movable wall.

9. A brake booster according to claim 8, wherein
said second movable wall includes
a rolling diaphragm having its inner edge clamped between said partition wall and the outer surface of said tubular member.

10. A brake booster according to claim 9, wherein
said pipe includes
a first wall opening in the area of the vacuum chamber associated with said one movable wall, and
a second wall opening in the area of a vacuum chamber associated with said other movable wall.

* * * * *